United States Patent
Young et al.

(10) Patent No.: US 8,640,779 B2
(45) Date of Patent: Feb. 4, 2014

(54) MUD PULSER ACTUATION

(75) Inventors: Allen Young, Houston, TX (US); James Frederick Huber, Pearland, TX (US)

(73) Assignee: Multishot LLC, Conroe, TX (US)

( * ) Notice: Subject to any disclaimer, the term of this patent is extended or adjusted under 35 U.S.C. 154(b) by 610 days.

(21) Appl. No.: 12/744,893

(22) PCT Filed: Nov. 26, 2008

(86) PCT No.: PCT/US2008/085005
§ 371 (c)(1),
(2), (4) Date: Oct. 22, 2010

(87) PCT Pub. No.: WO2009/070751
PCT Pub. Date: Jun. 4, 2009

(65) Prior Publication Data
US 2011/0024653 A1  Feb. 3, 2011

Related U.S. Application Data

(60) Provisional application No. 60/990,210, filed on Nov. 26, 2007.

(51) Int. Cl.
*E21B 47/18* (2012.01)
(52) U.S. Cl.
USPC .......................................... 166/373; 166/66.7
(58) Field of Classification Search
USPC .............. 166/194, 95.1, 77.4, 386, 383, 66.6, 166/66.7, 64, 373
See application file for complete search history.

(56) References Cited

U.S. PATENT DOCUMENTS

| 3,613,732 | A | | 10/1971 | Willson |
| 4,401,134 | A | * | 8/1983 | Dailey ..................... 137/624.11 |
| 4,472,113 | A | | 9/1984 | Rogen |
| 5,079,920 | A | | 1/1992 | Whitehead |
| 7,051,808 | B1 | * | 5/2006 | Vinegar et al. ............. 166/250.1 |
| 7,836,973 | B2 | * | 11/2010 | Belcher et al. .................. 175/25 |
| 2004/0194970 | A1 | * | 10/2004 | Eatwell et al. ................ 166/387 |
| 2006/0048936 | A1 | * | 3/2006 | Fripp et al. ................. 166/244.1 |
| 2007/0228309 | A1 | | 10/2007 | Friedman |
| 2008/0251743 | A1 | * | 10/2008 | Giovangrossi et al. ......... 251/11 |
| 2008/0251746 | A1 | * | 10/2008 | Riley et al. .............. 251/129.06 |
| 2009/0032237 | A1 | * | 2/2009 | Bane et al. ...................... 166/53 |

FOREIGN PATENT DOCUMENTS

| EP | 0304944 A2 | 3/1989 |
| WO | 0133306 A2 | 5/2001 |

OTHER PUBLICATIONS

International Search Report and Written Opinion for PCT/US08/085005 mailed Apr. 2, 2009.

* cited by examiner

*Primary Examiner* — David Andrews
(74) *Attorney, Agent, or Firm* — Winstead PC

(57) ABSTRACT

A system and method for transmitting mud pulse signals in a downhole environment may utilize a shape memory alloy. In one embodiment, a mud pulser system includes a valve; a wire comprising shape memory alloy (SMA), and operable to have a first shape at a first temperature and a second shape at a second temperature; a thermal energy source to heat the wire from the first temperature to the second temperature; and a valve poppet coupled to the wire, wherein the valve poppet is extended to close the valve when the wire is in the first shape and wherein the valve poppet is retracted to open the valve when the wire is in the second shape.

18 Claims, 3 Drawing Sheets

MUD PULSER ACTUATION

CROSS REFERENCE TO RELATED APPLICATION

The present application claims priority to U.S. Provisional Application Ser. No. 60/990,210, filed Nov. 26, 2007. This provisional application is incorporated by reference herein in its entirety.

FIELD OF INVENTION

The present invention relates in general to equipment for drilling operations and more specifically, but not by way of limitation to a mud pulsing actuation device and method for doing same.

BACKGROUND OF INVENTION

Conventional mud pulsing devices generate a pressure pulse by inserting a poppet which can be actuated either directly or by means of a hydraulic ram into an orifice. The drawbacks of conventional methods of actuating the pulser orifice include high electrical current demands and high maintenance costs due to the number of moving parts. Accordingly and for the aforementioned reasons, there is a need for a cheaper mud pulsing device that can generate mud pulses at relatively low power and over several cycles.

SUMMARY OF THE INVENTION

The present invention relates to systems and methods for transmitting mud pulse signals in a downhole environment. In one embodiment, a mud pulser system is disclosed. The mud pulser system includes a valve; a wire comprising shape memory alloy (SMA) and operable to have a first shape at a first temperature and a second shape at a second temperature; a thermal energy source to heat the wire from the first temperature to the second temperature; and a valve poppet coupled to the wire, wherein the valve poppet is extended to close the valve when the wire is in the first shape and wherein the valve poppet is retracted to open the valve when the wire is in the second shape.

According to another embodiment, a method for generating a mud pulse signal is disclosed. The method includes the steps of providing a mud pulser tool having a valve poppet; providing a SMA wire coupled to the valve poppet; positioning the mud pulser tool into the downhole environment; heating the SMA wire from a first temperature to second temperature, transitioning the wire transitions from a first shape to a second shape; and retracting the valve poppet to open the valve.

The foregoing has outlined some of the features and technical advantages of the present invention in order that the detailed description of the invention that follows may be better understood. Additional features of the invention will be described herein after which form the subject of the claims of the invention.

BRIEF DESCRIPTION OF THE DRAWINGS

A more complete understanding of the system of the present invention may be obtained by reference to the following Detailed Description when taken in conjunction with the accompanying Drawings wherein.

DETAILED DESCRIPTION OF THE INVENTION

Figure 1:
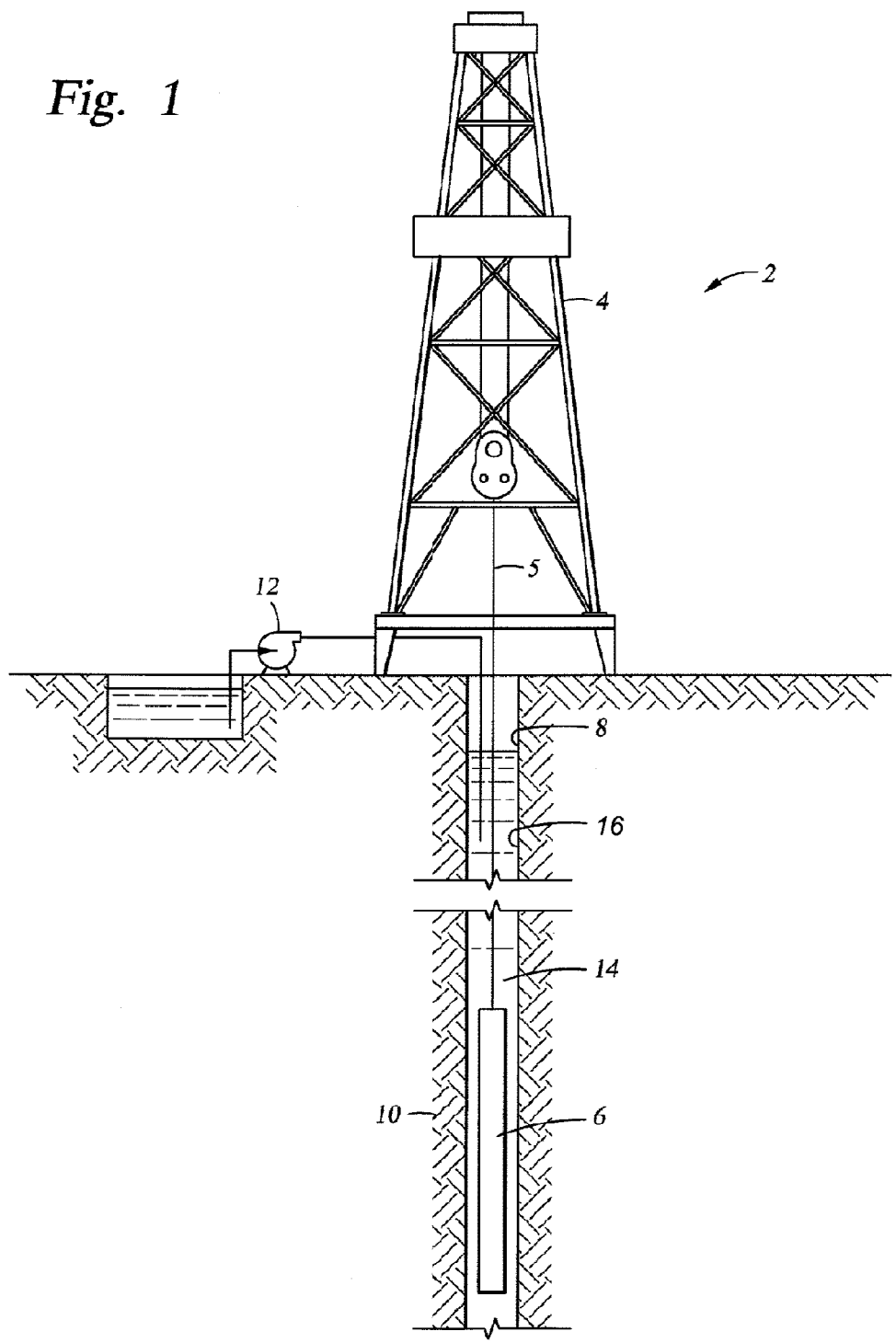
FIG. 1 shows an illustrated embodiment of Measurement While Drilling (MWD) mud pulsing data transmission system of the present invention.

In the following detailed description, reference is made to the accompanying drawings that show, by way of illustration, specific embodiments in which the invention may be practiced. These embodiments are described in sufficient detail to enable those skilled in the art to practice the invention. It is understood that the various embodiments of the invention, although different, are not mutually exclusive. For example, a particular, feature, structure, or characteristic described herein in connection with one embodiment may be implemented within other embodiments without departing from the spirit and scope of the invention. In addition, it is understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with a full range of equivalents to which the claims are entitled. In the drawings, like numerals refer to the same or similar functionality throughout the several views.

A mud pulser device is used in conjunction with a MWD system to provide relevant information about wellbore features without halting regular drilling operations. The pulser receives parameters from the attached sensors and creates a series of pressure pulses which can be observed from the surface receiver connected to the drill pipe assembly. Based on the timing of the pulses, statistics such as temperature, gamma ray count rate, or inclination and azimuth may be decoded.

Given the high costs associated with this data transmission process, existing MWD mud pulsers use a pilot valve to operate a large hydraulic ram as a means of conserving power. The hydraulic ram forces a choke into an orifice as it extends and retracts, partially restricting the flow of the drilling fluid. This main poppet which can be actuated either directly or by means of a hydraulic ram creates the pulses in the drilling pipe which are decoded on the surface.

There are, however, different actuation methods for the operation of the pilot valve. One design involves the pilot valve being operated by solenoid such that the linear motion of the solenoid directly opens and closes the pilot valve. Another design involves a rotary motor and gearing system that implements a ball screw to convert the rotary motion to linear motion. Another similarly designed alternative incorporates an oil-submersed brushless DC motor. The drawbacks of these conventional methods of actuating the pulser orifice include high electrical current demands and high maintenance costs due to the number of moving parts. Accordingly, for the aforementioned reasons, there is a need for a cheaper mud pulsing device that can generate mud pulses at relatively low power and over several cycles.

One of the major contributors to downhole failure of pulsers is the breakdown of pulser components. Motors, bearings, gearboxes, ball-screws, and other friction items are difficult to replace and add considerable expense to the operating cost of a tool. In addition, motor suppliers cannot easily and economically meet the reliability requirements desired for downhole usage. The presently disclosed embodiments of a mud pulser actuation system use a SMA wire to actuate the pilot valve of the mud pulser. Accordingly, the mud pulser actuation system provides a more direct and efficient method of linear actuation because the servo/pilot valve extension rod actuated by a compression spring and variable length SMA wire. In addition, the disclosed embodiments of the mud pulser system utilize relatively lower power and fewer moving parts than conventional designs.

FIG. 1 shows an example of a system for transmitting MWD data, indicated generally by the numeral 2. System 2 includes rig 4 to suspend or position tool 6 within borehole 8 formed within earth formation 10. Tool 6 may be a mud pulser, MWD tool, logging-while-drilling (LWD) tool or similar downhole device for generating mud pulse signals. Tool 6 may be a wireline tool (e.g., positioned via wireline 5). Alternatively, tool 6 may be a generator or battery operated tool. Tool 6 may be seated in a mule shoe in a landing sub. System 2 includes mud pump 12 to circulate drilling mud 14 within borehole 8. System 2 includes surface device 16 to receive mud pulse signals transmitted by tool 6.

Figure 2:
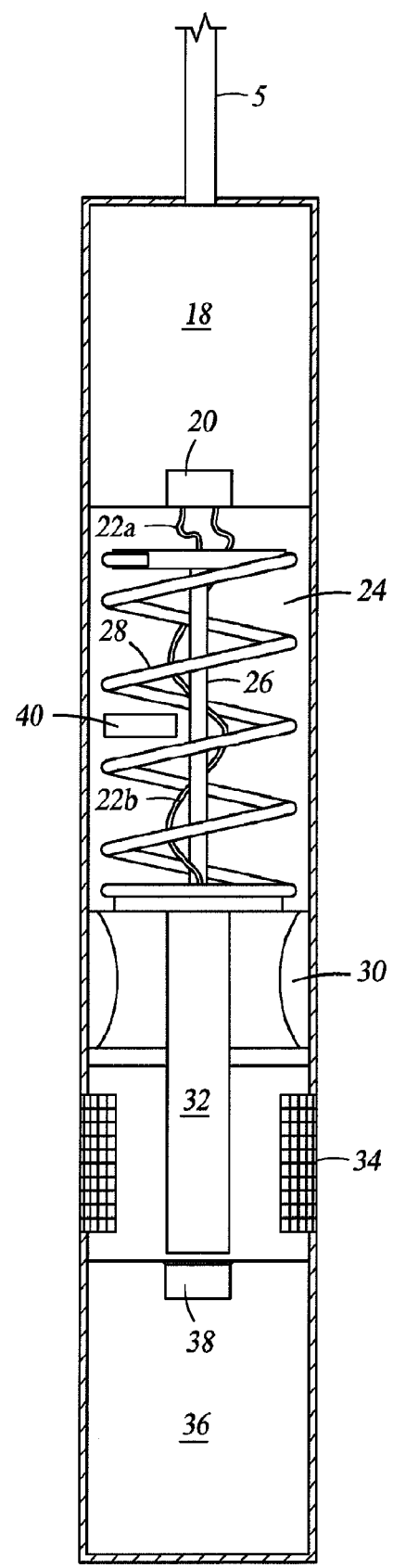
FIG. 2 shows a cross-section of the mud pulser or wireline tool of the present invention.
Figure 3:
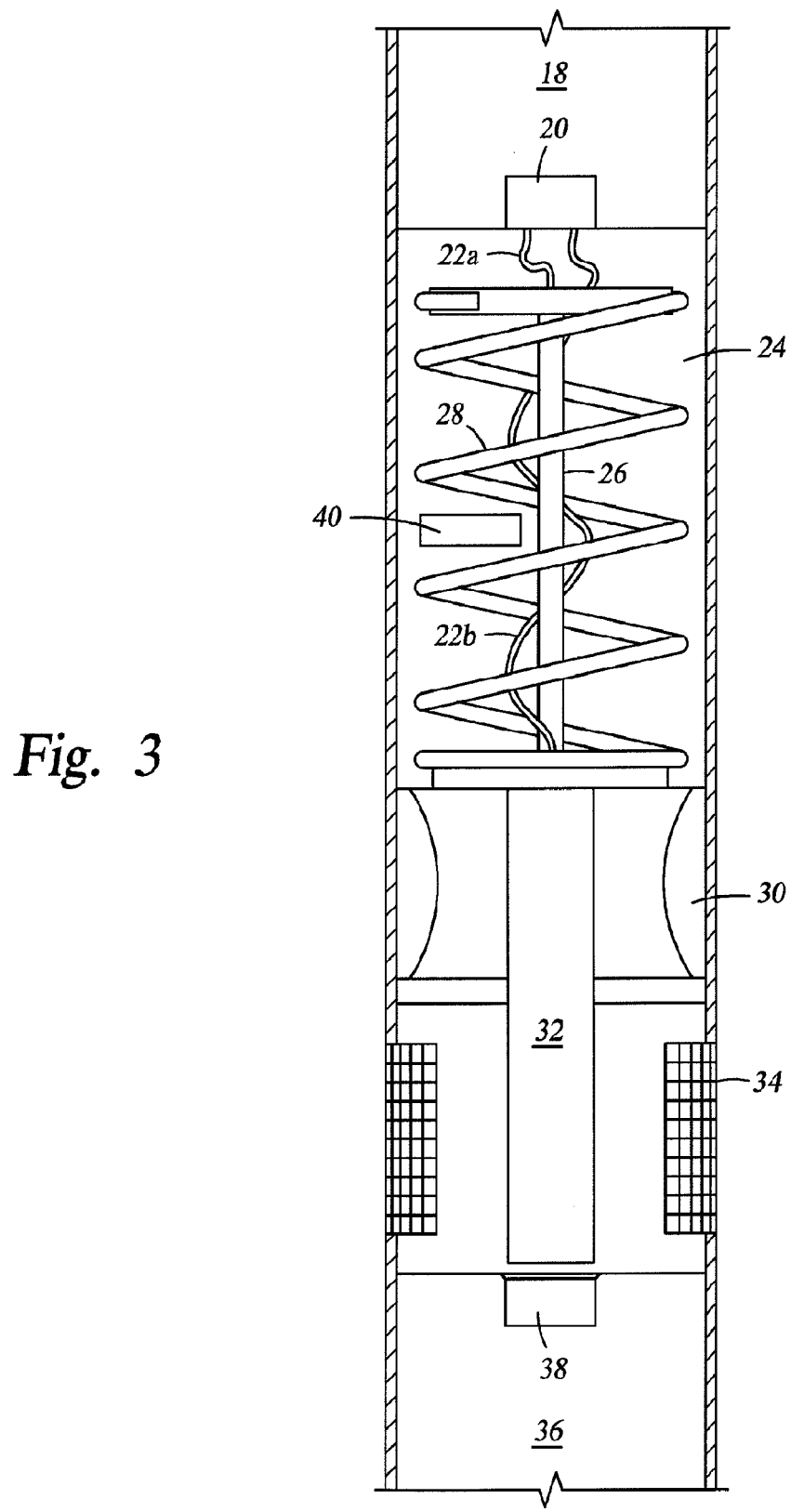
FIG. 3 shows a different illustration of the cross-section of the mud pulser or wireline tool of the present invention as outlined in FIG. 2.

FIG. 2 shows a cross-section of an embodiment of tool 6. Tool 6 includes pulser electronics 18, which may include power supply, sensors, processors, and other electronic devices. Tool 6 includes wire 26. Wire 26 is coupled to pulser electronics 18 via electrical connectors 22a,b via high-pressure electrical pass-through bulkhead 20. Wire 26 is coupled to servo/pilot valve poppet 32. Spring 28 is coupled to poppet 32. Wire 26, electrical connectors 22a,b and spring 28 are positioned within chamber 24, which is oil-filled and pressurized. Tool 6 includes compensation bladder 30, pulser flow screens 34, piston unit 36 and valve seat 38. Valve seat 38 is a cylindrical orifice.

Wire 26 comprises SMA material, smart alloy, memory metal, muscle wire, or any similar material that, through a memory effect, including without limitation, the one-way and two-way memory effects, can regain or be returned to its original geometry, e.g., crystallographic composition, after being deformed, e.g., by applying heat to the alloy. SMA material repeatedly switches between austenite and martensite phases at a prescribed temperatures and applied stress. When formed as wire, SMA materials will change length significantly at a specified temperature. For example, heating the SMA component of wire 26 causes wire 26 to contract while cooling wire 26 along with a minimal deformation force will allow wire 26 to return to its elongated position. As long as the stress levels remain sufficiently low, this process can be repeated for a substantial number of cycles, e.g., for as many as a million cycles.

An example of suitable material for wire 26 includes 'Flexinol' produced by Dynalloy in California. Flexinol is a Nickel Titanium (NiTi) shape memory alloy commonly referred to as Nitinol. Nitinol wire like other SMAs has a high electrical resistance such that the resistance of the wire to electric current quickly generates sufficient heat (ohmnic heating) to bring the wire through its transition temperature and cause the wire to contract. Exploitation of such pseudo-elastic properties of SMA materials therefore, results and depends on temperature dependant reactions which alter the properties of the compound from martensite to austenite and vice-versa. Other examples of suitable materials include, without limitation, CuSn, InTi, TiNi, and MnCu.

Wire 26 is deformed by the application of heat and, as wire 26 cools down, wire 26 may recover its original shape with the help of a counter-force which resets or stretches the wire back to its original length. The temperatures at which wire 26 changes shape, e.g., the transformation temperature, is based on the composition and tempering of the SMA of wire 26. For example, wire 26 could comprise material with a transition temperature range of approximately 140-220° C. This is sufficiently high enough to allow cooling downhole via the typical 125-150° C. mud flow. If direct electrical current is used, it could provide adequate heating to cause the wire to contract to 1.5-2% strain. Wire 26 may be selected or processed to meet specific qualifications for length, diameter, tensile strength, and transition temperature, among other parameters.

In one embodiment, tool 6 electrically heats wire 26 with an electrical current generated by thermal energy source 18 and delivered to wire 26 via connectors 22. Thermal energy source 18 may comprise pulser electronics and connectors 22 may comprise electrical connectors. Alternatively, thermal energy source 18 can comprise other electrical sources to generate heat such as batteries, a generator or even a capacitor bank. In other examples, thermal energy source 18 may comprise a heat pump, combustion device or any other source of thermal energy conveyed by radiation or convection. As wire 26 is heated to the transformation temperature, wire 26 undergoes macroscopic deformation that is manifested as a contraction or strain. As wire 26 contracts due to heating, wire 26 displaces poppet 32 from its default position (e.g., displacing poppet 32 such that valve seat 38 is opened). As wire 26 cools and returns to its original length, poppet 32 may return to its default position (e.g., allowing poppet 32 to close the valve by blocking valve seat 38). Rapid cooling can be achieved by means of agitator 40 near wire 26.

Accordingly, Tool 6 uses electrically heated wire 26 to mechanically actuate a valve to generate mud pulses. Wire 26 may act to replace traditional mechanical linkages such as a motor, gearbox, and ball screw. Wire 26 may be used to operate either a pilot valve or the main valve of an MWD system. In the example shown in FIG. 2, wire 26 actuates a pilot valve (which includes poppet 32 and valve seat 38).

In one example, shown in FIG. 2, spring 28 supplies force contrary to the direction of the force of the contraction of wire 26. For instance, spring 28 may be a pre-loaded compression spring that will be compressed as wire 26 is heated. In this example, spring 28 provides the closing force for the valve and the contracted wire 26 provides the opening force. For example, as shown in FIG. 2, the default (off) pilot valve position is closed. When wire 26 is heated wire 26 will contract, compressing spring 28 and moving poppet 32 to open valve seat 38, up to the maximum strain of wire 26. A single contraction of wire 26 may produce sufficient force to overcome spring 28 and move poppet 32, e.g., open valve seat 38 for 1-2 seconds to produce a mud pulse signal. As wire 26 is re-cooled spring 28 will deform wire 26 and push poppet 32 back to its default position to close the pilot valve. For example, when the pulser is configured to give a servo poppet travel of ⅛ of an inch, the SMA wire with an operating range of 140-220° C. will produce a strain of up to 2%. A 6.25 inch length of wire will yield a strain of about 0.125 inches, adequate to actuate the poppet while six wires in parallel will produce a max pull force of 46 lbf. Additionally, a spring force of approximately 20 lbs will adequately close the poppet and allow compression from the SMA wire.

The mud pulser and method of actuation as disclosed herein, may be more efficient than other conventional actuation tools and methods because it reduces the number of moving parts and reduces the chance of mechanical failure, thus providing improved tool reliability. The disclosed mud pulser tool may also be more efficient than convention tools because the SMA wire directly activates the valve with no friction losses from bearings and gearings or moving parts. Additionally, there is a substantial cost benefit to using an SMA actuated pulser. An SMA wire only costs a few dollars compared to the several thousand dollars needed for a motor/ball-screw system. Furthermore, with motors having a short operating life of about 500 hours, the savings on parts and services for operating a single pulser each year, also amounts to several thousand dollars.

Other examples of the disclosed mud pulser actuation system may use different arrangements or configurations of the SMA wire with respect to the valve to fit the needs of the particular device or application. Other examples include: contraction of the SMA wire to oppose a compression spring, contraction of the SMA wire to oppose an extension spring, alternate contraction of the SMA wire to facilitate bi-directional motion, using fluidic forces to create the default closing/opening force and the SMA wire to create unidirectional opening/closing force only, or an SMA wire wrapped around a circular element to create rotational motion/force.

Although the disclosed system and method has been described in connection with a mud pulser device, one of ordinary skill in the relevant arts will recognize that the disclosed system and method may be used in any system where a valve is opened or closed by linear motion from an electrical signal.

From the foregoing detailed description of specific embodiments of the invention, it should be apparent that a mud pulser actuation system and method that is novel has been disclosed. Although specific examples have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed examples without departing from the spirit and scope of the invention as defined by the appended claims which follow.

What is claimed is:

1. An mud pulser system for transmitting mud pulse signals in a downhole environment comprising:
   a valve seat;
   a wire comprising shape memory alloy, operable to have a first shape at a first temperature and a second shape at a second temperature;
   a thermal energy source to heat the wire from the first temperature to the second temperature;
   a valve poppet coupled to the wire, wherein the valve poppet is extended to close the valve seat when the wire is in the first shape and wherein the valve poppet is retracted to open the valve seat when the wire is in the second shape; and
   an agitator to cool wire from the second temperature to the first temperature.

2. The system of claim 1 wherein the wire has the first shape at an ambient temperature of the downhole environment.

3. The system of claim 1 wherein the wire has a first length at the first temperature and a second length at the second temperature.

4. The system of claim 1 further comprising:
   a spring coupled to the wire, wherein the spring provides a counter-force to return the wire to the first shape.

5. The system of claim 1, wherein the wire comprises a two-way memory alloy.

6. The system of claim 1, wherein the wire comprises a Nickel-Titanium shape memory alloy.

7. The system of claim 1, wherein the thermal energy source comprises an electronic device.

8. The system of claim 1, wherein the thermal energy source comprises a battery.

9. The system of claim 1, wherein the thermal energy source comprises a capacitor.

10. An mud pulser actuation system comprising:
    a valve seat;
    a shape memory alloy (SMA) wire;
    a thermal energy source to heat the wire from a first temperature to second temperature,
    wherein the wire transitions from a first shape to a second shape;
    a valve poppet coupled to the wire, wherein the valve poppet is extended to close the valve seat when the wire is in the first shape and retracted to open the valve seat when the wire is in the second shape;
    an agitator to cool the wire from the second temperature to the first temperature; and
    a spring coupled to the wire, wherein the spring provides a counter-force to return the wire to the first shape.

11. The actuation system of claim 10 wherein the SMA wire at the first position closes the valve seat by extending the valve poppet at ambient temperatures and upon heating, contracts to the second position, retracting the valve poppet and opening the valve seat to generate a pulse.

12. The actuation system of claim 10, wherein said shape memory alloy wire comprises a two-way memory alloy.

13. A method for transmitting mud pulses in a downhole environment comprising drilling mud, the method comprising the steps of:
    providing a mud pulser tool having a valve poppet;
    providing a shape memory alloy (SMA) wire coupled to the valve poppet;
    positioning the mud pulser tool into the downhole environment;
    heating the SMA wire from a first temperature to second temperature,
    transitioning the wire transitions from a first shape to a second shape;
    retracting the valve poppet to open a valve seat; and
    activating an agitator to cool the wire from the second temperature to the first temperature.

14. The method of claim 13, further comprising the steps of:
    allowing the SMA wire to cool to the first temperature; and
    transitioning the wire transitions from the second shape to the first shape; and
    closing the valve seat.

15. The method of claim 13, wherein the step of providing a SMA wire coupled to the valve poppet comprises the step of providing a two-way memory alloy.

16. The method of claim 13, wherein the step of providing a SMA wire coupled to the valve poppet comprises the step of providing a Nickel-Titanium shape memory alloy wire.

17. The method of claim 13, wherein the step of heating the SMA wire from a first temperature to second temperature, further comprising the step of activating an electronic device.

18. The method of claim 13, further comprising the step of providing a counter-force to return the wire to the first shape.

* * * * *

UNITED STATES PATENT AND TRADEMARK OFFICE
CERTIFICATE OF CORRECTION

PATENT NO. : 8,640,779 B2  Page 1 of 1
APPLICATION NO. : 12/744893
DATED : February 4, 2014
INVENTOR(S) : Young et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 760 days.

Signed and Sealed this
Twenty-second Day of September, 2015

Michelle K. Lee
*Director of the United States Patent and Trademark Office*